United States Patent
Cohen et al.

(10) Patent No.: US 10,911,740 B2
(45) Date of Patent: *Feb. 2, 2021

(54) SYSTEM AND METHOD FOR MITIGATING OR PREVENTING EYE DAMAGE FROM STRUCTURED LIGHT IR/NIR PROJECTOR SYSTEMS

(71) Applicant: Corephotonics Ltd., Tel-Aviv (IL)

(72) Inventors: Noy Cohen, Tel Aviv (IL); Ephraim Goldenberg, Ashdod (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,992

(22) Filed: May 10, 2020

(65) Prior Publication Data

US 2020/0275080 A1    Aug. 27, 2020

Related U.S. Application Data

(63) Continuation of application No. 16/378,627, filed on Apr. 19, 2019, now Pat. No. 10,694,168.

(Continued)

(51) Int. Cl.
*H04N 13/254* (2018.01)
*H04N 13/25* (2018.01)
*H04N 13/239* (2018.01)

(52) U.S. Cl.
CPC ......... *H04N 13/254* (2018.05); *H04N 13/239* (2018.05); *H04N 13/25* (2018.05)

(58) Field of Classification Search
None
See application file for complete search history.

(56) References Cited

U.S. PATENT DOCUMENTS

| | | | |
|---|---|---|---|
| 4,199,785 A | 4/1980 | McCullough et al. | |
| 5,005,083 A | 4/1991 | Grage et al. | |

(Continued)

FOREIGN PATENT DOCUMENTS

| | | |
|---|---|---|
| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Fernando Alcon
(74) *Attorney, Agent, or Firm* — Nathan & Associates; Menachem Nathan

(57) ABSTRACT

Systems and methods for mitigating or preventing eye damage from structured light IR/NIR projector systems. When a SL projector with a multi-light-source array that projects a SL pattern onto an object, a first camera images the light pattern projected on the object and optionally provides camera frames viewed by a user. A multi-light-source array controller is configurable to control separately an on or off status and/or an intensity of each light source in the multi-light-source array, and an algorithm is operative to detect in the first camera frames SL pattern elements projected onto the object, to detect the eyes of the user, to compare a position of each projected SL pattern element with a position of the detected eyes, and to send commands to the multi-light-source array controller to turn off or reduce the intensity of array light sources that are projected or likely to be projected onto the user's eyes.

13 Claims, 3 Drawing Sheets

Related U.S. Application Data

(60) Provisional application No. 62/661,017, filed on Apr. 22, 2018.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,709,078 B1* | 4/2014 | Friend ................ A61F 2/14 623/5.11 |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 10,168,531 B1* | 1/2019 | Trail .................... G02B 27/017 |
| 10,521,920 B2* | 12/2019 | Grunnet-Jepsen ... H04N 13/257 |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0002109 A1* | 1/2003 | Hochberg ............ H04B 10/077 398/139 |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0198405 A1* | 9/2006 | Guenter ................ G01J 1/4257 372/29.021 |
| 2006/0227236 A1 | 10/2006 | Pak |
| 2007/0024737 A1 | 2/2007 | Nakamura et al. |
| 2007/0126911 A1 | 6/2007 | Nanjo |

(56) References Cited

U.S. PATENT DOCUMENTS

| | | |
|---|---|---|
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0127854 A1* | 5/2013 | Shpunt .......... H04N 13/398 345/420 |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0208856 A1* | 7/2014 | Schmid .......... A61B 5/0035 73/662 |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0272638 A1* | 9/2017 | Lee .......... H04N 5/2256 |
| 2017/0289458 A1 | 10/2017 | Song et al. |
| 2017/0307759 A1* | 10/2017 | Pei .......... H04N 13/239 |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin |
| 2018/0295292 A1 | 10/2018 | Lee et al. |
| 2018/0300901 A1 | 10/2018 | Wakai et al. |
| 2018/0366045 A1* | 12/2018 | Perreault .......... H04N 5/332 |
| 2019/0072771 A1* | 3/2019 | Hall .......... G01B 5/0014 |
| 2019/0121103 A1 | 4/2019 | Bechar et al. |
| 2019/0295279 A1* | 9/2019 | Wang .......... G01B 11/2513 |

(56) References Cited

U.S. PATENT DOCUMENTS

| | | | | |
|---|---|---|---|---|
| 2019/0391271 | A1* | 12/2019 | Goodwill | G01S 17/10 |
| 2020/0012113 | A1* | 1/2020 | Keller | G01S 7/4817 |
| 2020/0028329 | A1* | 1/2020 | Gronenborn | H01S 5/1039 |

FOREIGN PATENT DOCUMENTS

| | | | |
|---|---|---|---|
| CN | 102739949 A | | 10/2012 |
| CN | 103024272 A | | 4/2013 |
| CN | 103841404 A | | 6/2014 |
| EP | 1536633 A1 | | 6/2005 |
| EP | 1780567 A1 | | 5/2007 |
| EP | 2523450 A1 | | 11/2012 |
| JP | S59191146 A | | 10/1984 |
| JP | 04211230 | | 8/1992 |
| JP | H07318864 A | | 12/1995 |
| JP | 08271976 A | | 10/1996 |
| JP | 2002010276 A | | 1/2002 |
| JP | 2003298920 A | | 10/2003 |
| JP | 2004133054 A | | 4/2004 |
| JP | 2004245982 A | | 9/2004 |
| JP | 2005099265 A | | 4/2005 |
| JP | 2006238325 A | | 9/2006 |
| JP | 2007228006 A | | 9/2007 |
| JP | 2007306282 A | | 11/2007 |
| JP | 2008076485 A | | 4/2008 |
| JP | 2010204341 A | | 9/2010 |
| JP | 2011085666 A | | 4/2011 |
| JP | 2013106289 A | | 5/2013 |
| KR | 20070005946 A | | 1/2007 |
| KR | 20090058229 A | | 6/2009 |
| KR | 20100008936 A | | 1/2010 |
| KR | 20140014787 A | | 2/2014 |
| KR | 101477178 B1 | | 12/2014 |
| KR | 20140144126 A | | 12/2014 |
| KR | 20150118012 A | | 10/2015 |
| WO | 2000027131 A2 | | 5/2000 |
| WO | 2004084542 A1 | | 9/2004 |
| WO | 2006008805 A1 | | 1/2006 |
| WO | 2010122841 A1 | | 10/2010 |
| WO | 2014072818 A2 | | 5/2014 |
| WO | 2017025822 A1 | | 2/2017 |
| WO | 2017037688 A1 | | 3/2017 |
| WO | 2018130898 A1 | | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: Eurographics, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

\* cited by examiner

SYSTEM AND METHOD FOR MITIGATING OR PREVENTING EYE DAMAGE FROM STRUCTURED LIGHT IR/NIR PROJECTOR SYSTEMS

CROSS-REFERENCE TO RELATED APPLICATIONS

This application is a continuation application from U.S. patent application Ser. No. 16/378,627 filed Apr. 9, 2019 (now allowed), and is related to and claims priority from U.S. Provisional Patent Application No. 62/661,017 filed Apr. 22, 2018, which is expressly incorporated herein by reference in its entirety.

FIELD

Embodiments disclosed herein relate in general to near infra-red (NIR) structured light projection and imaging systems which are aimed at faces.

BACKGROUND

Recently, mobile devices such as cell-phones (and in particular smart-phones) have started to incorporate a front-facing projection-and-imaging system that is used for applications such as face identification and face tracking. Often, such systems are based on a structured light (SL) projector that may operate in the near-infra-red (NIR) range and which projects a pattern onto a user's face. Structured light is a process of known pattern projection (e.g. dots or lines) onto an object or scene. Pattern imaging with a camera (e.g. a dedicated and pre-calibrated camera) allows depth calculation of the object or the scene.

In this disclosure, NIR refers to the wavelength range of 780 nm-1120 nm, which is invisible to the human eye. A NIR-sensitive camera images the face with the pattern projected on it. A processor can then calculate depth from the relative position of pattern elements projected on the face. This depth information is then used for many applications, like 3D modeling of the face, security face identification (such as unlocking the mobile device, authorizing payments, etc.), augmented reality applications, camera effects (such as bokeh), avatar animation, etc. In some cases, the SL projector component comprises an array of vertical cavity surface emitting laser (VCSEL) elements that are replicated using a diffractive optical element (DOE) (e.g. a Dammann diffraction grating) and then imaged onto a scene. Each VCSEL creates a separate dot of NIR light. The spatial arrangement of the VCSELs in the array and the replicating DOE determines how the dots are imaged onto the scene.

Projecting a pattern in the NIR range on a user's face can potentially be harmful to the eyes. The retina is sensitive to light in the NIR range. Research has shown that prolonged exposure to it, beyond a certain intensity threshold, may cause damage to the retina in the form of IR cataracts and flash burns due to a rise in temperature. Therefore, eye safety regulations normally limit the intensity and duration of SL pattern projection (see, e.g. regulation IEC/EN 62471 and others).

It is therefore beneficial to have a front-facing structured light system that can minimize or eliminate projection of NIR light onto the eyes and increase. Such a system can also increase the light intensity provided by a SL projector while keeping eye safety regulations.

SUMMARY

Embodiments disclosed herein relate to a system and method that significantly reduce the exposure of mobile device users' eyes to potentially harmful NIR light emitted from SL projectors embedded in the device. This is done by locating and tracking the user's eyes in camera frames, registering them to the position of imaged VCSELs and controlling the intensity of VCSELs in the VCSEL array so that no VCSEL is imaged onto the user's eyes.

In exemplary embodiments, there are provided systems comprising a SL projector having a multi-light-source array that projects a SL pattern onto an object, a first camera for imaging the light pattern projected on the object and, optionally, for imaging the object to provide first camera frames, a multi-light-source array controller configurable to control separately an on or off status and/or an intensity of each light source in the multi-light-source array, and an algorithm operative to detect in the first camera frames SL pattern elements projected onto the object, to detect a user's eyes, to compare a position of each projected SL pattern element with a position of the detected eyes, and to send commands to the multi-light-source array controller to turn off or reduce the intensity of array light sources that are projected or likely to be projected onto the user's eyes.

In an exemplary embodiment, a system further comprises a second camera for imaging the object, wherein the second camera provides a second stream of frames.

In an exemplary embodiment, the algorithm is further operative to turn on or to increase the intensity of light sources that are not projected onto the user's eyes.

In an exemplary embodiment, the multi-light-source array is a VCSEL array comprising a plurality of VCSELs and the multi-light-source array controller is a VCSEL array controller.

In an exemplary embodiment, the SL projector is a NIR SL projector and the first camera is a NIR camera.

In an exemplary embodiment, the second camera is a RGB camera.

In an exemplary embodiment, a system as above or below is included in a mobile electronic device.

In an exemplary embodiment, the mobile electronic device is a smart-phone.

In exemplary embodiments, there are provided methods, comprising: using a SL projector having a multi-light-source array to project a SL pattern onto an object, using a first camera for imaging the light pattern projected on the object and optionally, for imaging the object to provide first camera frames, configuring a multi-light-source array controller to control separately an on or off status and/or an intensity of each light source in the multi-light-source array, detecting in the first camera frames SL pattern elements projected onto the object and detecting a user's eyes, comparing a position of each detected SL pattern element with a position of the detected eyes, and
sending commands to the multi-light-source array controller to turn off or reduce the intensity of array light sources that are projected or likely to be projected onto the user's eyes.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein and should not be considered limiting in any way.

DETAILED DESCRIPTION

Figure 1:
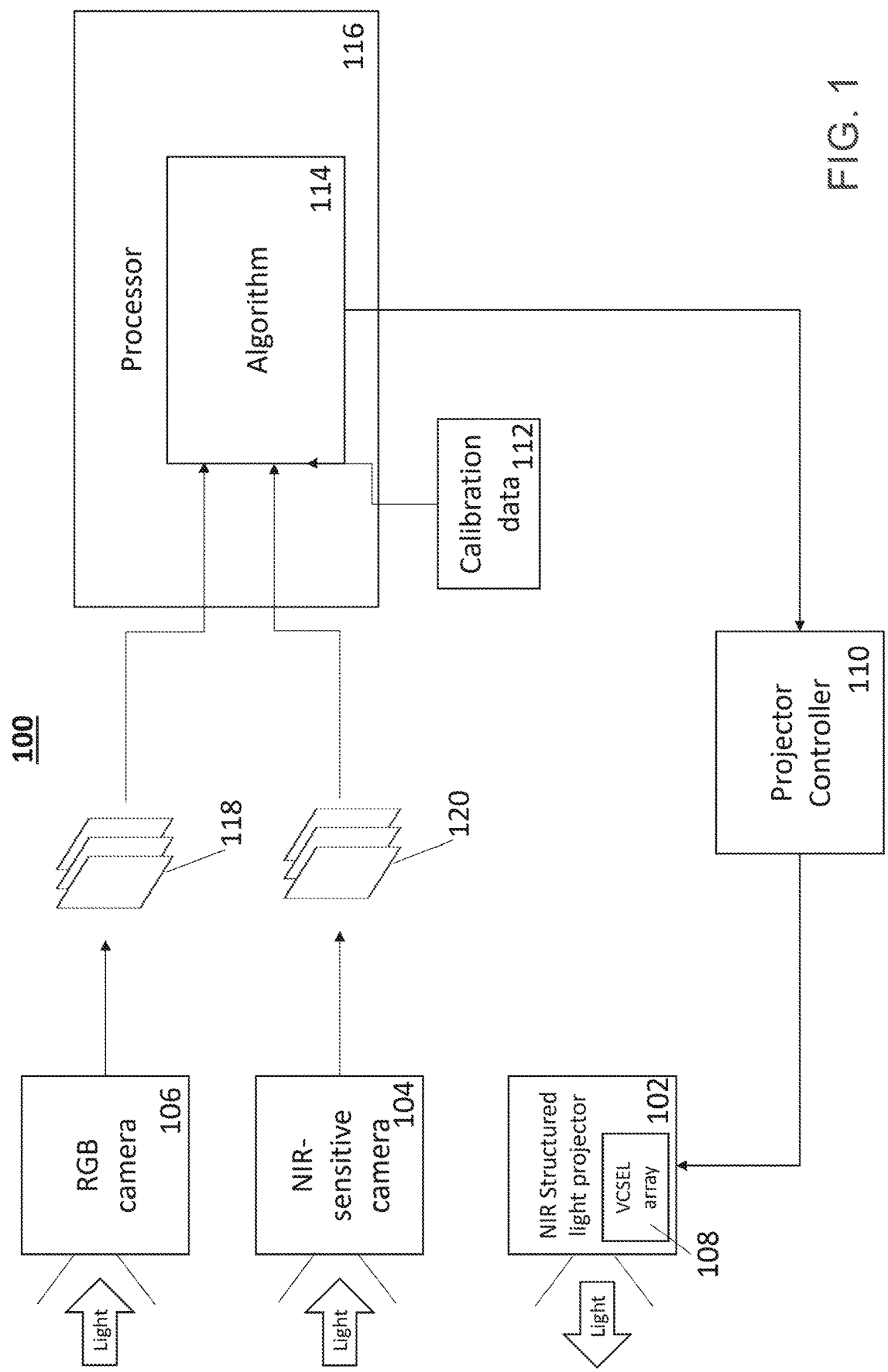
FIG. 1 shows a block diagram of the system according to aspects of presently disclosed subject matter.

FIG. 1 shows a block diagram of the system according to aspects of presently disclosed subject matter and numbered 100. System 100 that comprises a NIR structured light projector 102 (referred herein simply as a projector), for example a projector based on a VCSEL array 108 with independently addressable elements, an NIR-sensitive camera 104 and a red-green-blue (RGB) camera 106 (e.g. a color camera used for imaging an object on a sensor). Projector 102 may include other light source arrays (and thus be referred to as a "multi-light-source" array) with individually addressable and controlled light source elements, for example an array of micro light-emitting-diodes (micro LEDs). Hereafter, the description continues with specific reference to a VCSEL array, with the understanding that the proposed system and methods apply to a SL projector with other arrays of independently controlled light sources.

In an embodiment, RGB camera 106 and NIR-sensitive camera 104 are a single camera that is sensitive to visible light and also to NIR light.

System 100 further includes a VCSEL array controller (or "projector controller") 110, implemented in hardware (HW) or software (SW). VCSEL array controller 110 can control VCSEL array 108 and turn on, turn off, or modify the intensity of each VCSEL element (or simply "VCSEL"), separately and independently of the other VCSELs, based on input signals. In other words, each VCSEL is individually addressable and controllable by controller 110.

System 100 further includes calibration data 112 for calibrating NIR-sensitive camera 104, RGB camera 106 and projector 102. Calibration data 112 may be used to align the fields of view (FOVs) of the two cameras and of the projector and to compensate for parallax, tilts, assembly tolerances, etc. In some cases, calibration data 112 may be calculated and stored in system 100 during an assembly process. In some cases, calibration data 112 may be adaptively calculated and stored in system 100 during its usage.

System 100 further includes an algorithm 114 that can be implemented in HW or in SW, (for example by configuring a processor 116 to run it). Algorithm 114 is responsible for determining VCSELs of the array to be turned on or off or to have their intensity modified. The algorithm detects and tracks the position of the eyes of the user looking at the device and controls VCSEL array 108 in a way that VCSEL illumination on the eyes is decreased and/or turned off. The algorithm evaluates continuously images from RGB camera 106 and/or NIR-sensitive camera 104 and sends continuously commands to VCSEL array controller 110 to turn-off or reduce the intensity of VCSELs that may be imaged onto the eyes of the user, and to turn-on or increase the intensity of VCSELs that are no longer imaged onto the eyes and therefore do not pose a threat to cause damage.

In an embodiment, processor 116 may be included in system 100 and algorithm 114 may be implemented in SW. In an embodiment, VCSEL array controller 110 may be implemented in SW on the processor. In another embodiment, VCSEL array controller 110 and/or algorithm 114 may be implemented in dedicated HW.

Figure 2A:
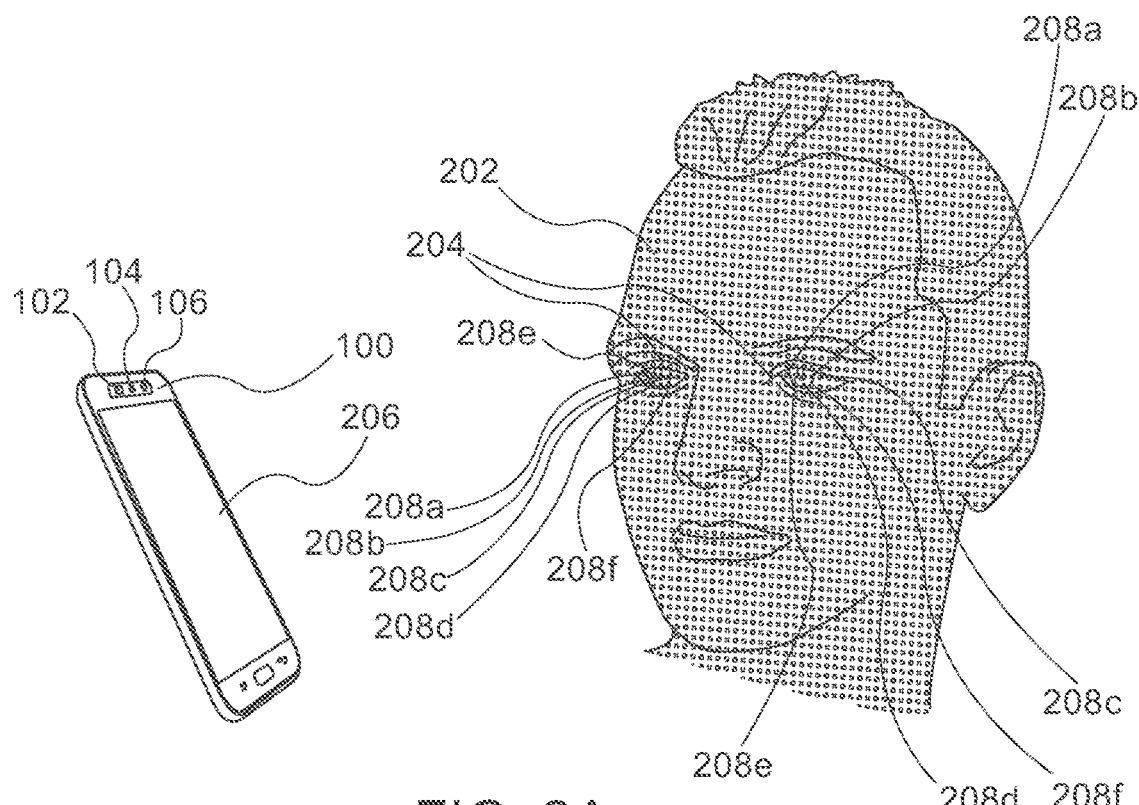
FIG. 2A shows schematically the system of FIG. 1 incorporated in a smart-phone, with the projector projecting a pattern onto a user's face including eyes.
Figure 2B:
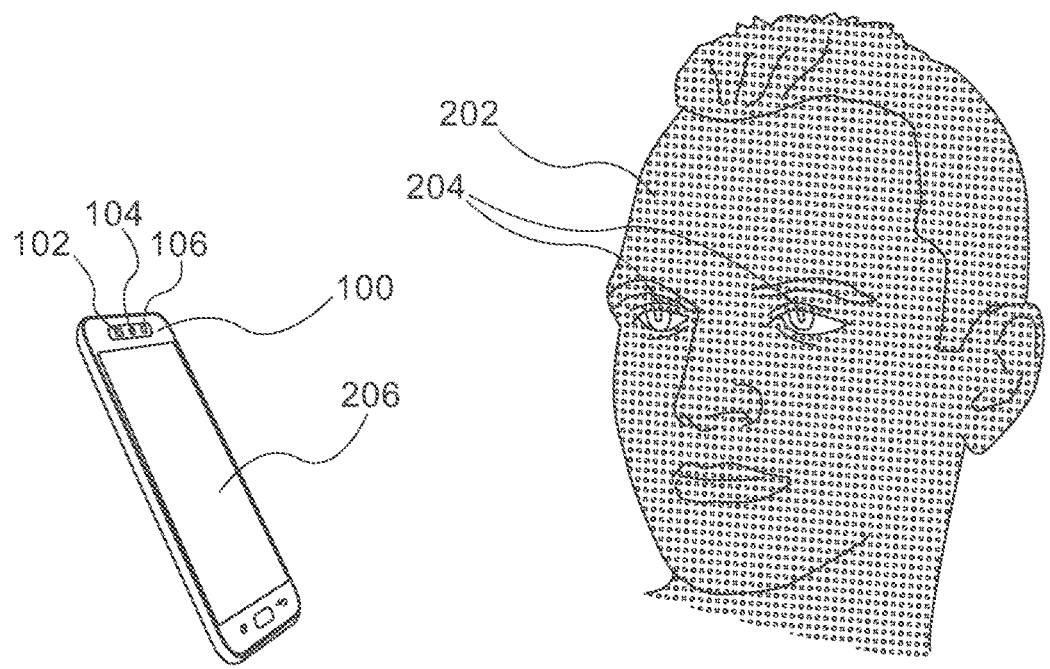
FIG. 2B shows the same features as FIG. 2A, except that pixels of the projected patterns are removed from the user's eyes.

System 100 may be included or incorporated in, for example, a mobile electronics device such as a smart-phone, a tablet computer, a laptop computer, etc. FIGS. 2A and 2B show schematically system 100 incorporated in a smart-phone 200 having a smart-phone display 206. Projector 102, NIR-sensitive camera 104 and RGB camera 106 are front-facing, i.e. are facing a user face 202 with eyes 204 when smart-phone 200 faces the user. Projector 102 and cameras 104 and 106 may be arranged to share substantially the same FOV (e.g. more than 80% or 90% or 95% of the FOV of each element is shared with other elements) for a range of distances, for 108 that are imaged into the eyes of user 202, the projected In use, projector 102 projects a pattern onto an object or scene. For example, in FIGS. 2A and 2B, projector 102 projects a pattern having pattern dots (points) onto user face 202 and eyes 204. In FIG. 2A, the pattern consists of evenly spread points. This is just a non-limiting example of one possible pattern. Other patterns may be used, in particular a semi-random pattern. The systems and methods described herein may be used in a similar manner regardless of the projected pattern. The pattern dots in eyes 204 are marked in FIG. 2A as 208a-208f. RGB camera 106 collects visible light and produces a stream of RGB frames 118. NIR-sensitive camera 104 collects NIR light and produces a stream of NIR frames 120, which may include the pattern produced by projector 102. RGB frames 118, NIR frames 120 and calibration data 112 are input to algorithm 114. Algorithm 114 calculates which VCSELs in VCSEL array 108 should modify their intensity based on frames 118 and 120 and calibration data 112 and produces a set of commands to VCSEL array controller 110. VCSEL array controller 110 controls VCSEL array 108 according to the commands, which in turn affect the SL pattern projected onto the scene.

In an use embodiment, algorithm 114 may analyze the input frames 118 from the RGB camera 106 and/or input frames 120 from NIR-sensitive camera 104, detects the position of the eyes (e.g. eyes 204) in the image using known techniques (such as image processing, computer vision or machine learning), estimates the distance from projector 102 to eyes 204 of user 202, for example, by measuring the distance between eyes 204 in frames 118 or 120, or by measuring the size of the face in the image, and inferring the distance of user 202 to system 100; uses the position of the eyes in the image, the estimated user distance and calibration data 112 between projector 102, RGB camera 106 and NIR-sensitive camera 104 to determine the VCSELs that may be imaged onto the subject's eyes (for example, in FIG. 2A, VCSELs imaged as dots 208a-208f); and sends commands to VCSEL array controller 110 to turn off or reduce the intensity of the specific VCSELs (perhaps, keeping some safety margins around the eyes), and to turn back on or increase the intensity back to standard levels of VCSELs that are not imaged onto the subject's eyes. In addition, algorithm 114 updates related applications that use VCSEL array 108 data about the modification to the VCSELs' intensity.

Specifically, in an example shown in FIG. 2B, the commands to VCSEL array controller 110 is to turn off the VCSELs projecting dots 208a-208f, such that these dots are removed from the pattern seen in FIG. 2B. In other cases the command may be to reduce the intensity of the dots projected to the eyes.

In an use embodiment, when VCSEL array 108 becomes active, algorithm 114 finds the position of the eyes in RGB camera 106 using computer vision techniques, and registers the relevant sections in the image from RGB camera 106 to the image from NIR-sensitive camera 104 that images the pattern projected by projector 102. The registration can make use of calibration data 112. After the registration process, algorithm 114 finds which VCSELs in VCSEL array 108 are imaged onto the user's eyes by looking for projected pattern elements imaged by NIR-sensitive camera 104 that are in the region of the eyes.

In an use embodiment, algorithm 114 continues to track the position and distance of the eyes over time in a stream of RGB frames 118 and/or NIR frames 120, also by making use of projected pattern data or depth map (if such is available) and calibration data, and continuously updates VCSEL array 108, turning back on or increasing back the intensity of VCSELs that do not cover the eyes and turning off or reducing the intensity of VCSELs that cover them.

In an use embodiment, algorithm 114 uses the image data from NIR-sensitive camera 104 to detect whether any VCSELs are imaged onto the user's eyes, by extracting the eyes position using computer vision techniques and checking whether any VCSEL is imaged onto them by looking for projected pattern elements imaged by NIR-sensitive camera 104 at the region of the eyes. Algorithm 114 continuously tracks the position of the eyes and updates VCSEL array 108 through VCSEL array controller 110 accordingly.

In an use embodiment, algorithm 114 analyzes the image of NIR-sensitive camera 104 and/or RGB camera 106 after VCSEL array 108 has been turned on (without any modification of VCSELs intensity from operation without the algorithm improvement suggested herein), detects the region where the eyes are located, registers the image from RGB camera 106 to the image from NIR-sensitive camera 104, and finds whether any VCSELs illuminate the eyes.

Figure 3:
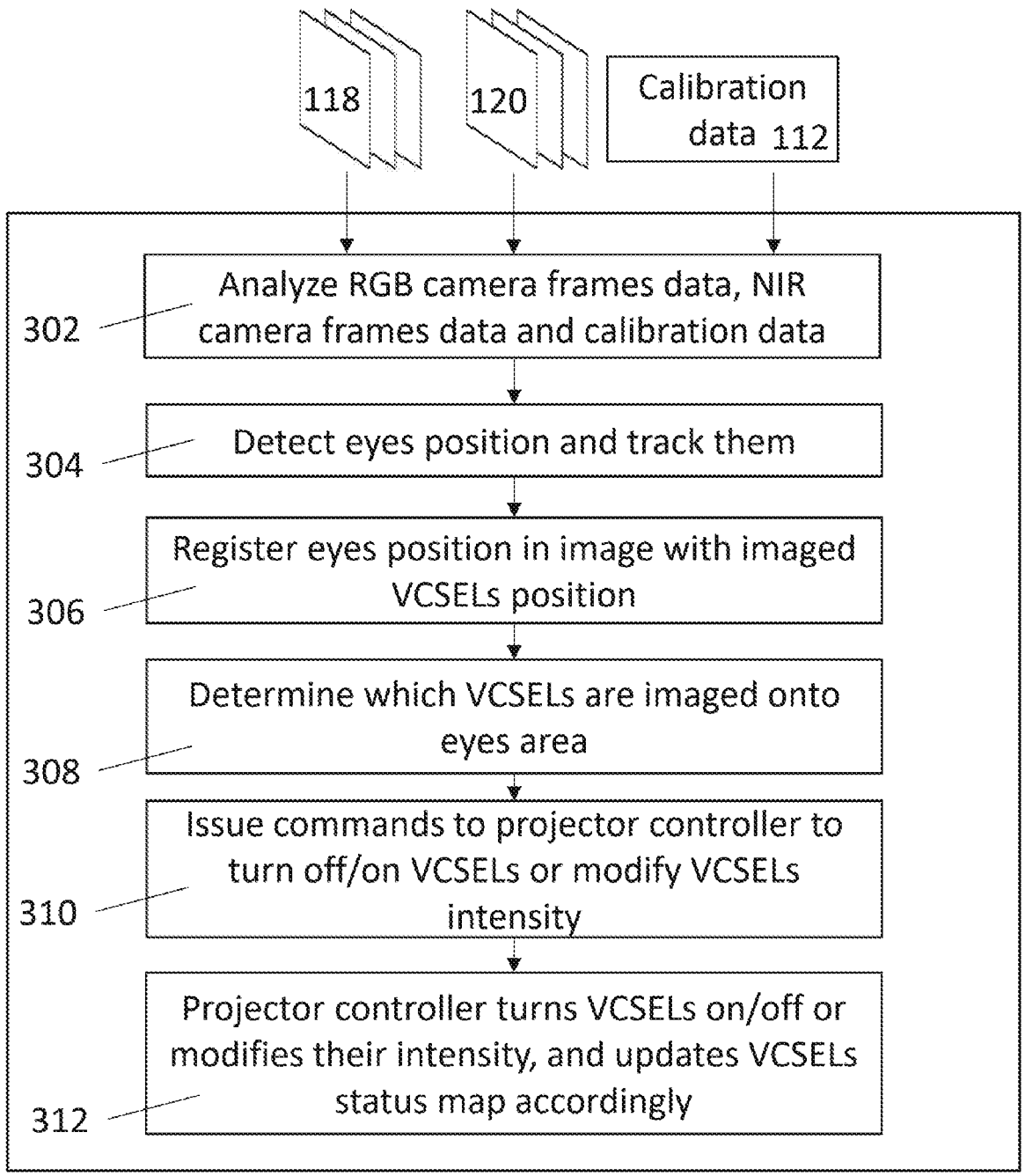
FIG. 3 illustrates in a flow chart a method according to aspects of presently disclosed subject matter.

When VCSEL array controller 110 turns off some of the VCSELs in VCSEL array 108 that are imaged into the eyes of user 202, the projected pattern coverage of the field of view is compromised, not only in the area of the eyes but also in other areas, since the image of VCSEL array 108 is replicated many times in order to cover a large FOV, for example between 40 degrees diagonal and 80 degrees diagonal. There could be between several such replications (for example, 4-5) to thousands of them (for example 2000). The data from VICSELs that have been turned off may be interpolated using VCSELs that are imaged to nearby positions in the FOV. FIG. 3 depicts in a flow chart an exemplary embodiment of the operation of system 100.

In step 302, an analysis of frames from RGB camera 106 and frames from NIR-sensitive camera 104 is performed, also using calibration data 112. In step 304, eyes position is detected in these frames, and the position is tracked across frames in time. In step 306, the eyes position is registered and compared to imaged VCSELs positions. In step 308, it is determined which VCSELs cover the eyes area, if any. In step 310, commands are issued to VCSEL array controller 110 to turn off or reduce intensity of VCSELs that cover the eyes area and to turn back on or increase back intensity of VCSELs that do not cover the eyes area. In step 312, the controller executes the commands. In addition, in step 312, an updated expected VCSELs map is generated, considering the VCSELs that have been modified. This map can be used in various algorithms and system components that rely on the VCSEL data to perform various tasks. This series of steps runs continuously, on the stream of frames. The processing can be executed on a per-frame basis, or every number of frames.

The result of the proposed system and method is a significant reduction in exposure of the user eyes to NIR illumination from the structured light projector. In some cases, such a method may allow increasing the total power emitted from the SL projector while satisfying eye safety regulations, as the users eye is projected with none or less light that the case without using the proposed method.

While this disclosure has been described in terms of certain embodiments and generally associated methods, alterations and permutations of the embodiments and methods will be apparent to those skilled in the art. For example, while the disclosure refers to a front-facing structured light NIR projector, it applies also to a back-facing structured light NIR projector that can be used in conjunction with back-facing cameras in a mobile device. For example, while a system and method disclosed herein refers specifically to mobile devices, a similar system and method may be used/applied in non-mobile devices. The disclosure is to be understood as not limited by the specific embodiments described herein.

It is emphasized that citation or identification of any reference in this application shall not be construed as an admission that such a reference is available or admitted as prior art.

What is claimed is:

1. A system comprising:
    a) a structured light (SL) projector having a multi-light-source array that projects a SL pattern onto an object;
    b) a first camera for imaging the light pattern projected onto the object and, optionally, for imaging the object to provide a first stream of frames;
    c) a controller configurable to control separately an on or off status and/or an intensity of each light source; and
    d) an algorithm operative to detect in the first camera frames SL pattern elements projected onto the object, to detect eyes and to send to the controller commands based on the detected SL pattern elements and on the detected eyes, wherein the algorithm is further operative to turn on or to increase the intensity of light sources that are not projected onto the eyes.

2. The system of claim 1, further comprising a second camera for imaging the object, wherein the second camera provides a second stream of frames used to detect the eyes.

3. The system of claim 1, wherein the multi-light-source array is a VCSEL array comprising a plurality of VCSELs and wherein the controller is a VCSEL array controller.

4. The system of claim 2, where the multi-light-source array is a VCSEL array comprising a plurality of VCSELs and wherein the controller is a VCSEL array controller.

5. The system of claim 1, wherein the SL projector is a near infrared (NIR) SL projector and wherein the first camera is a NIR camera.

6. The system of claim 2, wherein the second camera is a RGB camera.

7. The system of claim 4, wherein the second camera is a RGB camera.

8. The system of claim 1, included in a mobile electronic device.

9. The system of claim 8, wherein the mobile electronic device is a smart-phone.

10. The system of claim 5, included in a mobile electronic device.

11. The system of claim 10, wherein the mobile electronic device is a smart-phone.

12. A method, comprising:
    a) using a structured light (SL) projector having a multi-light-source array to project a SL pattern onto an object;

b) using a first camera for imaging the light pattern projected on the object and optionally, for imaging the object to provide first camera frames;
c) configuring a controller to control separately an on or off status and/or an intensity of each light source;
d) detecting in the first camera frames SL pattern elements projected onto the object and detecting eyes; and
e) sending commands to the multi light source array controller based on the detected SL pattern elements and the detected eyes; and turning on or increasing the intensity of light sources that are not projected onto the eyes.

13. The method of claim 12, further comprising using a second camera for imaging the object, wherein the second camera provides a second stream of frames used to detect the eyes.

* * * * *